United States Patent
Feldner et al.

(10) Patent No.: US 11,623,532 B2
(45) Date of Patent: Apr. 11, 2023

(54) HOLDING ASSEMBLY FOR AN AUTOMOTIVE CHARGING SYSTEM

(71) Applicant: PHOENIX CONTACT E-Mobility GmbH, Schieder-Schwalenberg (DE)

(72) Inventors: Ralf Feldner, Horn-Bad Meinberg (DE); Carsten Garth, Lemgo (DE); Kai Schlueter, Luegde (DE)

(73) Assignee: PHOENIX CONTACT E-MOBILITY GMBH, Schieder-Schwalenberg (DE)

( * ) Notice: Subject to any disclaimer, the term of this patent is extended or adjusted under 35 U.S.C. 154(b) by 448 days.

(21) Appl. No.: 16/963,257

(22) PCT Filed: Jan. 11, 2019

(86) PCT No.: PCT/EP2019/050605
§ 371 (c)(1),
(2) Date: Jul. 20, 2020

(87) PCT Pub. No.: WO2019/141590
PCT Pub. Date: Jul. 25, 2019

(65) Prior Publication Data
US 2021/0362612 A1    Nov. 25, 2021

(30) Foreign Application Priority Data

Jan. 22, 2018    (DE) .................... 10 2018 101 325.6

(51) Int. Cl.
| | |
|---|---|
| *B60L 53/16* | (2019.01) |
| *H01R 13/516* | (2006.01) |
| *H01R 13/506* | (2006.01) |
| *H01R 13/74* | (2006.01) |

(52) U.S. Cl.
CPC ............ *B60L 53/16* (2019.02); *H01R 13/506* (2013.01); *H01R 13/516* (2013.01); *H01R 13/748* (2013.01); *H01R 2201/26* (2013.01)

(58) Field of Classification Search
CPC .............. H01R 2201/26; H01R 13/506; H01R 13/516; H01R 13/625; B60L 53/16
See application file for complete search history.

(56) References Cited

U.S. PATENT DOCUMENTS

| | | |
|---|---|---|
| 2007/0232116 A1 | 10/2007 | Vanssay et al. |
| 2009/0029584 A1 | 1/2009 | Sami |
| 2010/0220959 A1 | 9/2010 | Foss et al. |

(Continued)

FOREIGN PATENT DOCUMENTS

| | | |
|---|---|---|
| CN | 101047293 A | 10/2007 |
| CN | 101740944 A | 6/2010 |
| CN | 201725974 U | 1/2011 |

(Continued)

*Primary Examiner* — Briggitte R. Hammond
(74) *Attorney, Agent, or Firm* — Leydig, Voit & Mayer, Ltd.

(57) ABSTRACT

A holding assembly for holding an electrical charging device includes: a base plate having an upper side and at least one latching hook which extends from the upper side of the base plate and which latches with a latching contour of the charging device; and a securing frame which is attached to the base plate so as to be movable between a first position and a second position and clamps the latching hook in an open state in the first position and to secure the latching hook in a closed state in the second position.

18 Claims, 7 Drawing Sheets

(56) References Cited

U.S. PATENT DOCUMENTS

2012/0302085 A1 11/2012 Kyoyama
2015/0224887 A1 8/2015 Toth

FOREIGN PATENT DOCUMENTS

| | | | |
|---|---|---|---|
| CN | 102714375 | A | 10/2012 |
| CN | 203617482 | U | 5/2014 |
| CN | 106025697 | A | 10/2016 |
| DE | 19749852 | A1 | 6/1999 |
| DE | 102005058969 | A1 | 6/2007 |
| DE | 102009011388 | B3 | 8/2010 |
| DE | 102011004834 | A1 | 8/2012 |
| DE | 102014110466 | A1 | 1/2016 |
| EP | 2148397 | A2 | 1/2010 |
| EP | 2955794 | A1 | 12/2015 |
| JP | 2016009589 | A | 1/2016 |
| WO | 2014053221 | A1 | 4/2014 |
| WO | WO-2018091422 | A1 * | 5/2018 ........... H01R 13/516 |

* cited by examiner

Fig. 7

HOLDING ASSEMBLY FOR AN AUTOMOTIVE CHARGING SYSTEM

CROSS-REFERENCE TO PRIOR APPLICATIONS

This application is a U.S. National Phase application under 35 U.S.C. § 371 of International Application No. PCT/EP2019/050605, filed on Jan. 11, 2019, and claims benefit to German Patent Application No. DE 10 2018 101 325.6, filed on Jan. 22, 2018. The International Application was published in German on Jul. 25, 2019 as WO 2019/141590 under PCT Article 21(2).

FIELD

The invention relates to a holding assembly for holding an electric charging device. The invention further relates to a holding system and a motor vehicle, each comprising a holding assembly and a method for mounting a charging device using a holding assembly.

BACKGROUND

As described in WO 2014/053221 A1, vehicles with an electric drive may require charging devices with different configurations. Such a requirement arises, for example, from different country-specific standards with regard to charging stations or different vehicle systems. According to the technology described in WO 2014/053221 A1, a charging device takes the form of a modular system. In this case, a middle module that is universally usable is provided for mounting on the vehicle. This middle module has an interface on both the input and output sides for attaching an end module that can be selected from different modules.

The technology described in WO 2014/053221 A1 has the disadvantage that a compact design of the charging device is made more difficult by the modular design. In addition, the same manner of fastening the middle module to a body is provided for all applications of the charging device, whereby an optimization for different types of vehicles is made more difficult. In addition, the middle module of the charging device must be fastened directly to the body, whereby mounting the charging device is made more difficult.

DE 10 2011 004 834 A1, on the other hand, describes a charging device for an electric vehicle in which an adapter plate is provided in order to attach a standardized electrical component to different vehicle bodies.

The technology described in WO 2014/053221 A1 has the disadvantage of the adapter plate having to be screwed onto the electrical component, as a result of which mounting the charging device is also made more difficult.

SUMMARY

In an embodiment, the present invention provides a holding assembly for holding an electrical charging device, comprising: a base plate having an upper side and at least one latching hook which extends from the upper side of the base plate and which is configured to latch with a latching contour of the charging device; and a securing frame which is attached to the base plate so as to be movable between a first position and a second position and is configured to clamp the latching hook in an open state in the first position and to secure the latching hook in a closed state in the second position.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a holding assembly for a charging device which makes possible a high variability in application and at the same time simplifies mounting of the charging device.

Accordingly, a holding assembly for an electrical charging device comprises a base plate with an upper side and at least one latching hook which extends from the upper side of the base plate and which is provided for latching with a latching contour of the charging device. In addition, the holding assembly comprises a securing frame which is attached to the base plate such that it can move between a first position and a second position and is designed to clamp the latching hook into an open state in the first position and to secure the latching hook in a closed state in the second position.

The charging device can be a charging device for an electrically driven motor vehicle.

The latching hook may extend at least substantially perpendicular to the upper side of the base plate. The base plate may further have a plurality of latching hooks. The base plate can also have at least one fastening element for fastening the holding assembly. The fastening element can be designed for fastening the holding assembly in a motor vehicle. In particular, the fastening element can be designed to fasten the holding assembly to a body of a motor vehicle.

The base plate can also have at least one opening. The opening may be configured to allow access to the charging device from an underside of the base plate when the charging device is held in the holding assembly.

The securing frame can have at least one clamping contour for clamping the latching hook in the open state. In addition, the securing frame may comprise at least one securing contour for securing the latching hook in the closed state. In addition, the securing frame may have at least one recess. In this case, the securing frame can be attached to the base plate in such a way that the latching hook projects at least partially into the recess when the securing frame is in the first position.

A movement of the securing frame from the first position to the second position may correspond to a movement of the securing frame at least substantially perpendicular to the upper side. In this case, the movement can correspond to a movement in a direction proceeding from the upper side of the base plate.

The securing frame may comprise at least one operating tab for moving the securing frame manually from the first position into the second position. In addition, the securing frame may comprise at least one locking latching hook designed to latch with a locking latching contour of the charging device when the securing frame is in the second position. The locking latching hook may be provided to lock the securing frame in the second position.

According to a further aspect, a holding system for holding an electrical charging device is presented. The holding system comprises a holding assembly of the type presented here and a charging device having at least one latching contour. At least one latching hook of the holding assembly is designed for latching with the latching contour of the charging device.

The charging device can at least partially project through the opening of the base plate when the charging device is held by means of the holding assembly.

The charging device may comprise at least one contact element. The contact element can be arranged on a side of the charging device facing the upper side of the base plate. In addition, the contact element can be provided for contacting by means of a charging current source.

The at least one latching hook of the holding assembly can extend parallel to a plug-in direction of the charging device.

According to a further aspect, a motor vehicle is described. The motor vehicle comprises a holding assembly of the type presented here and/or a holding system of the type presented here.

According to a further aspect, a method for mounting a charging device in a motor vehicle is presented. The method comprises providing a holding assembly comprising a base plate with an upper side and at least one latching hook that extends from the upper side of the base plate and is provided for latching with a latching contour of the charging device, and a securing frame which is attached to the base plate so as to be movable between a first position and a second position and is designed to clamp the latching hook in an open state in the first position and to secure the latching hook in a closed state in the second position. The method further comprises providing a charging device having at least one latching contour, wherein the at least one latching hook of the holding assembly is designed for latching with the latching contour of the charging device; fastening the holding assembly to a body of the motor vehicle; arranging the charging device in the holding assembly, the securing frame being in the first position, and moving the securing frame into the second position to form a secured latching of the latching hook with the latching contour.

The arrangement of the charging device in the holding assembly may further comprise a pre-latching of the holding assembly and of the charging device by means of a pre-latching hook of the holding assembly and a pre-latching contour of the charging device.

Figure 1:
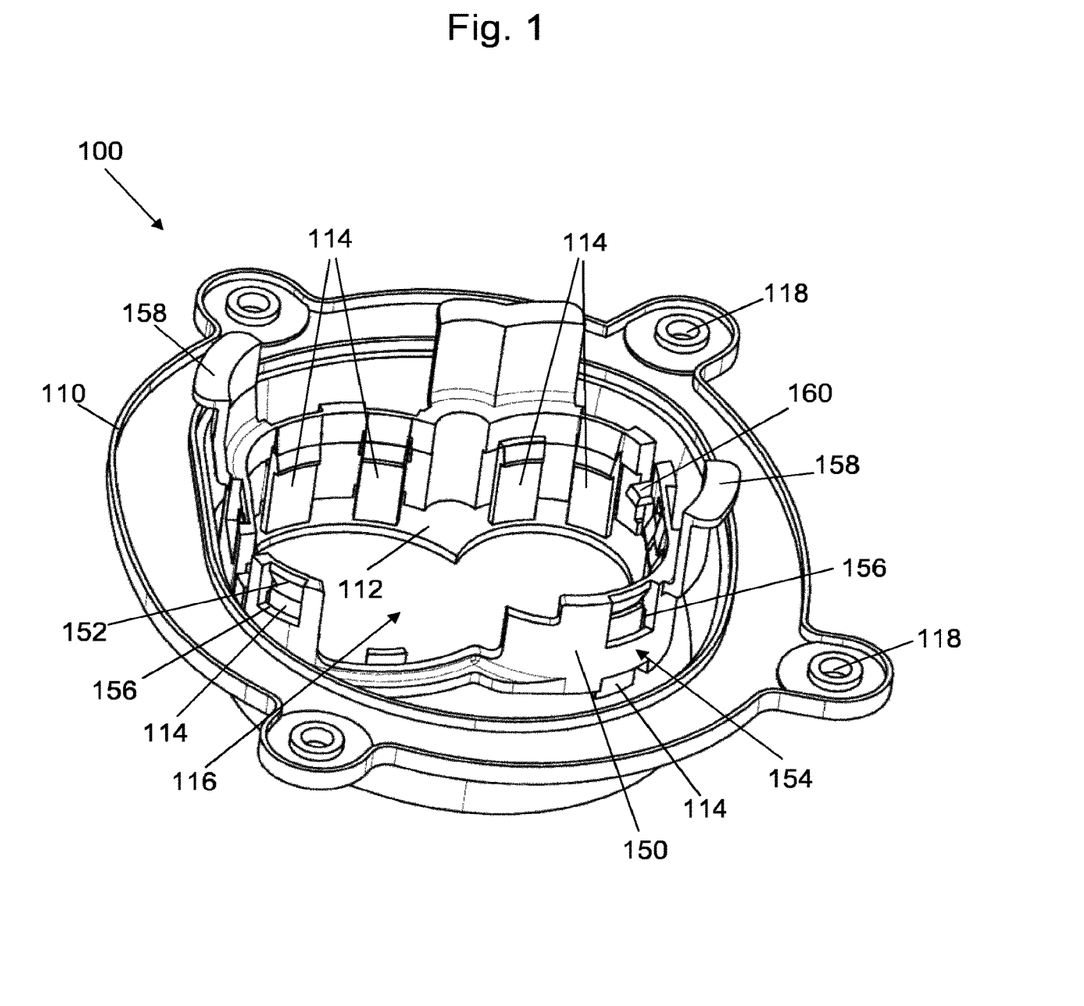
FIG. 1 is a schematic representation of a perspective view of a holding assembly for holding an electric charging device according to an exemplary embodiment.

FIG. 1 shows a schematic representation of a holding assembly 100 for holding an electrical charging device. The holding assembly 100 is provided, for example, for holding a charging device for an electrically driven motor vehicle.

The holding assembly 100 comprises a base plate 110 on the upper side 112 of which a plurality of latching hooks 114 are arranged. The latching hooks 114 are designed for latching with a latching contour of the charging device when the charging device is held in the holding assembly 100. In the example shown, the latching hooks 114 are arranged around an opening 116 in the base plate 110. The opening 116 allows access from an underside of the holding assembly 100 to a side of the charging device facing the upper side 112. In addition, the base plate 110 comprises a plurality of fastening elements 118 for fastening the holding assembly 100 as well as a charging device, optionally held therein, for example on the body of an electrically driven motor vehicle.

The holding assembly 100 further comprises a securing frame 150. The securing frame 150 is movably attached to the base plate 110. In the example shown, the securing frame 150 substantially surrounds the latching hooks 114, wherein the securing frame 150 is movable in the perpendicular direction with respect to the base plate 110.

The securing frame 150 comprises a plurality of operating tabs 158. The operating tabs 158 facilitate a manual movement of the securing frame 150 in relation to the upper side 112 of the base plate 110. In addition, the securing frame 150 has at least one locking latching hook 160 which is provided for latching with a locking latching contour of the charging device.

The securing frame 150 has a recess 156 in the region of each of the latching hooks 114 as well as a clamping contour 152 and a securing contour 154 adjacent to each of the recesses 156. The securing frame 150 is also arranged such that, in the position shown, each of the latching hooks 114 partially projects into a corresponding recess 156 of the securing frame 150. In this case, each latching hook 114 also bears with an outer side against the securing contour 154. In addition, each of the latching hooks 114 bears with the inner side of the section projecting into the recess 156 against a corresponding clamping contour 152 of the securing frame 150.

The securing frame 150 is movable in relation to the base plate 110 between a first position and a second position, for example by pulling on the operating tabs 158. In a first position, the securing frame 150 is lowered. The securing frame 150 here bears, for example, against the upper side 112 of the base plate 110. In this position, each of the clamping contours 152 causes the respective latching hook 114 bearing there to be clamped outwards into an open state. For this purpose, in the example shown, each of the clamping contours 152 has an outwardly oblique profile that presses outward an upper section of the latching hook 114. In addition, each of the recesses 156 here offers the space required for clamping the latching hook 114 into the open state.

The first position of the securing frame 150 enables a simplified, for example force-free, insertion of a charging device into the holding assembly 100. In particular, during mounting, the force required to open the latching hooks 114 need not be provided or only partially provided. The insertion can take place, for example, after a fastening of the holding assembly 100 to a vehicle body.

The securing frame 150 may be moved from the first into a second position, for example, by pulling on one or more of the operating tabs 158. In the second position, the securing frame 150 is located further away from the upper side 112 of the base plate 110. At the same time, the securing frame 150 is here partially pulled off the latching hooks 114. This causes the latching hooks 114 to be bent less strongly in the second position by the clamping contours 152 than in the first position. When the securing frame 150 is moved from the first into the second position, the latching hooks 114 thereby go into a closed state. For this purpose, the latching hooks 140 can consist, for example, of flexible material, for example flexible plastic, and can be pretensioned in the closed state. In the second position of the securing frame, the securing contour 154 also lies externally adjacent to an upper region of the latching hooks 114. The securing contour 154 thus prevents the latching hooks 114 from bending to the outside. As a result, the latching hooks 114 are secured in their closed state.

If a suitable charging device has been inserted into the holding assembly 100 while the securing frame 150 was in the first position, moving the securing frame 150 into the second position in the manner described will lead to a latching of the latching hooks 140 with a locking contour of the charging device. At the same time, the latching thus created is secured by the securing frame 150 against unwanted loosening. Moreover, the locking latching hook 160 permits locking of the securing frame 150 in the second position by latching with a locking latching contour of the charging device. An unwanted movement of the securing frame 150 back into the first position and thus possibly an unwanted opening of the latching hooks 114 can thereby also be avoided.

Figure 2:
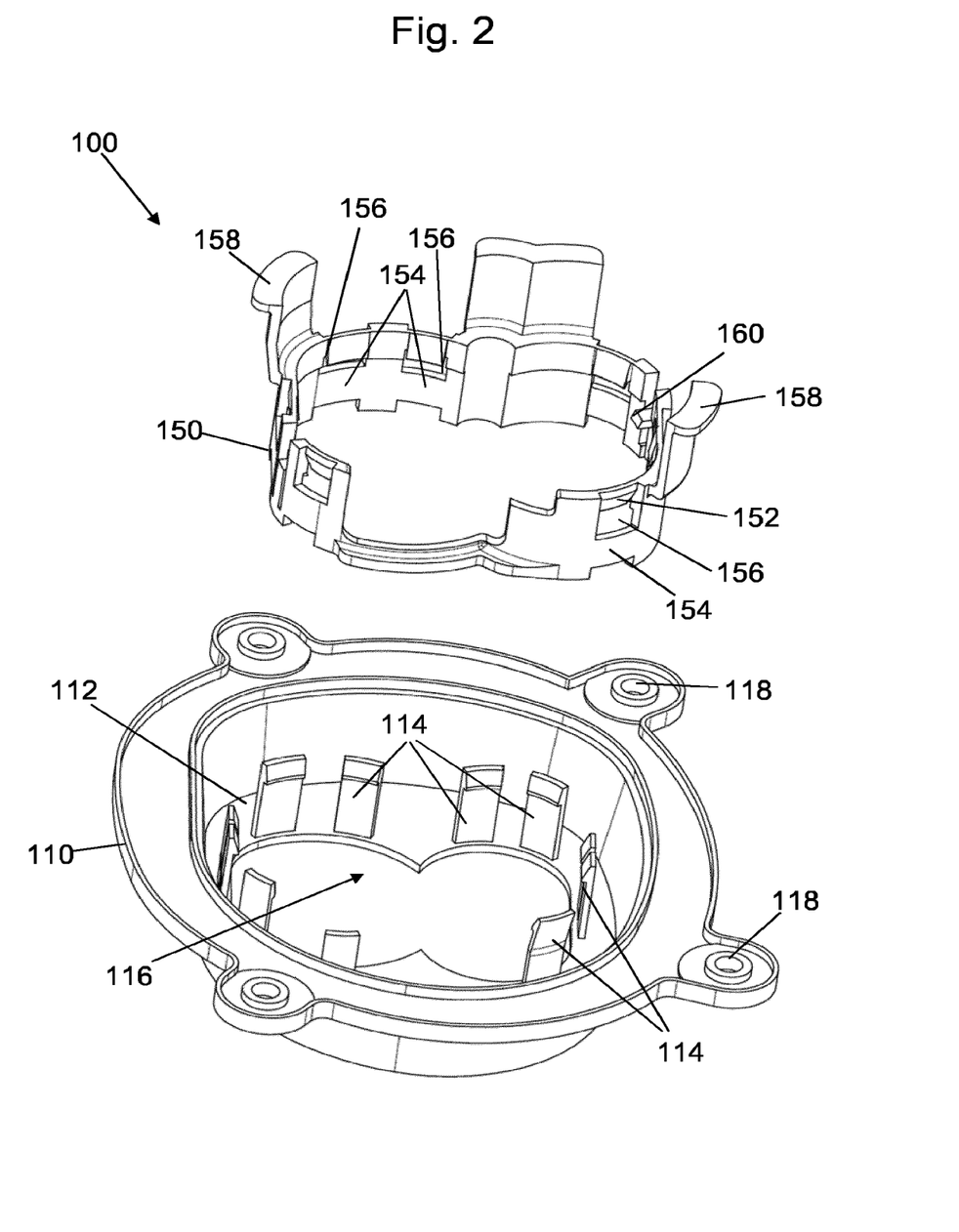
FIG. 2 is an exploded view of the holding assembly according to an exemplary embodiment.

FIG. 2 shows an exploded view of the holding assembly 100. The base plate 110 is here shown separately from the securing frame 150. The same reference numerals as in FIG. 1 denote the same features of the holding assembly 100 both here and in the following.

In FIG. 2 in particular the recesses 156 in the securing frame 150 as well as the contours consisting of the clamping contour 152 and securing contour 154 in each case adjoining a recess 156 can be seen. In addition, the arrangement of the locking latching hook 160 on the securing frame 150 can be seen. The locking latching hook 160 causes a latching of the securing frame 150 with respect to an inserted charging device, whereas the latching hooks 114 serve to latch the base plate 110 with respect to the charging device.

It can also be seen that, in the example shown, the upper side 112 of the base plate 110 is lowered relative to the fastening elements 118. This favors, for example, a protection of the held charging device by the base plate 110 or a mounting of the holding assembly 110 in a motor vehicle. In other examples, on the other hand, the base plate 110 is designed in a different way, for example with an arrangement of the upper side 112 with respect to the fastening elements 118 that differs from the illustrated lowered arrangement of the upper side 112. Further examples of the holding assembly 100 also have fastening elements which differ from the fastening elements 118 shown.

The holding assembly 100 can be used in any orientation for mounting, for example in an electrically driven motor vehicle. The orientation depicted, as well as the spatial terms used herein, such as "upper side," "above," "top," "underside," "bottom," "perpendicular," and so on, serve solely to illustrate positions and orientations of the described elements relative to each other and are not intended to be construed as limiting the arrangement or orientation of the holding assembly as a whole. In particular, in some examples, a charging device provided for use with the holding assembly 100 has contact elements for contacting by a charging current source on a side of the charging device facing the upper side 112 of the base plate 110. In some of these examples, a mounting of the holding assembly in a motor vehicle is also provided such that the opening 116 and the contact elements of the charging device accessible thereby face one side, for example a front side, of the motor vehicle.

Figure 3A:
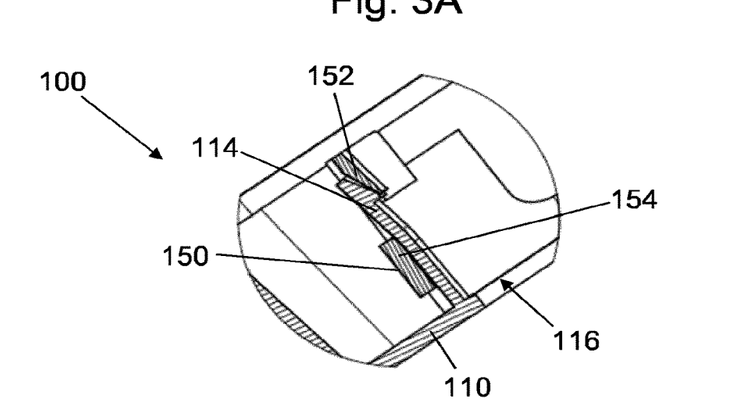
FIGS. 3A-3C are schematic representations of a portion of a cross-sectional view of the holding assembly with various positions of the securing ring according to an exemplary embodiment.
Figure 3B:
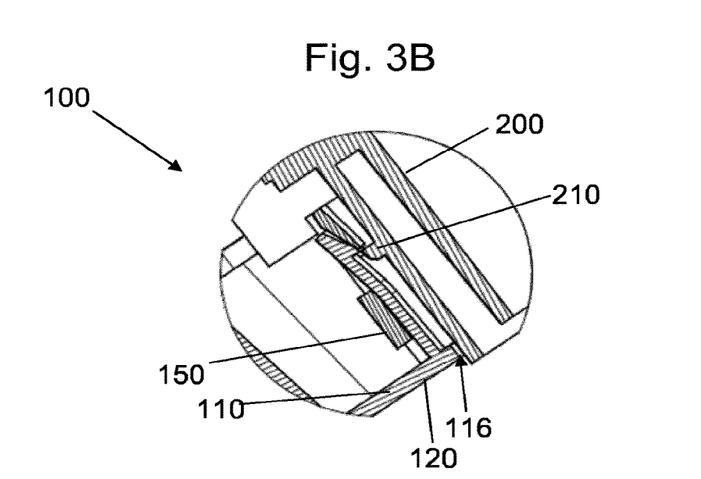
Figure 3C:
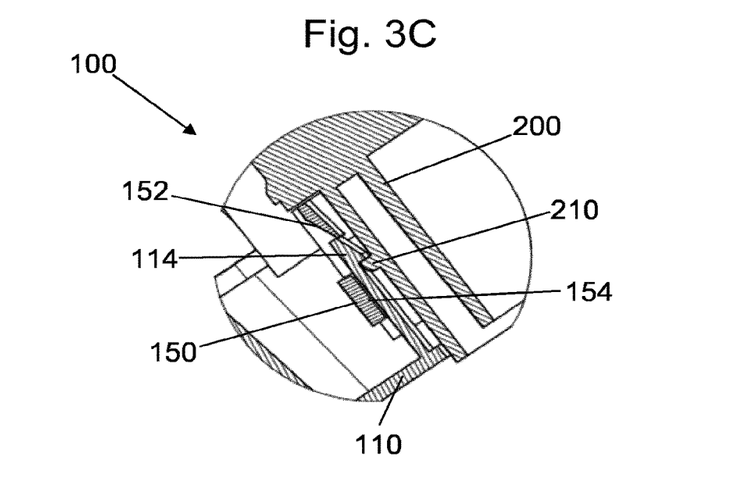

FIGS. 3A to 3C show a portion of a cross-sectional view of the holding assembly 100 in different positions as well as in connection with a mounting of an electrical charging device.

FIG. 3A shows the holding assembly 100 in the region of one of the latching hooks 114. In this case, the securing frame 150 is located in the first position, i.e. close to the upper side of the base plate 110. It can be seen that at this position of the securing frame 150 the latching hook 114 is clamped into an open state by means of the clamping contour 152. As described in connection with FIG. 1, an upper section of the latching hook 114 partially projects into a recess in the securing frame 150. It can also be seen that at this position of the securing frame 150 the securing contour 154 permits bending of the latching hook 114 since in the upper region of the latching hook 114 the securing contour 154 does not bear against the outer side of the latching hook 114.

FIG. 3B shows the holding assembly 100 in the same position as in FIG. 3A. FIG. 3B, however, also shows a charging device 200 inserted into the holding assembly 100. In the region close to the latching hook 114, the charging device 200 comprises a latching contour 210 which is designed for latching with the latching hook 114. The open state of the latching hook 114 makes it possible to insert the charging device 200 with virtually no effort. In the example shown, a slight pre-latching of the latching contour 210 with the latching hook 114 and/or the securing frame 150 occurs. In some examples, this facilitates a mounting of the charging device 200. In the example shown, the charging device 200 is designed to project partially through the opening 116 in the base plate 110.

FIG. 3C shows the holding assembly 100 with the charging device 200 inserted, as described in connection with FIG. 3B. In contrast to the arrangement shown in FIG. 3B, however, the securing frame 150 is in the second position. As described in connection with FIG. 1, moving the securing frame 150 from the first into the second position causes a latching of the latching hook 114 with the latching contour 210 and at the same time a securing of the latching by the securing contour 154 which now rests in a higher section on the outside of the latching hook 114 and thus prevents bending of the latching hook 114. When the securing frame 150 is moved into the second position, a latching of the locking latching hook 160 with a locking latching contour of the charging device 200 also takes place. In this way, the securing frame 150 is locked in the second position against unwanted movement.

Figure 4:
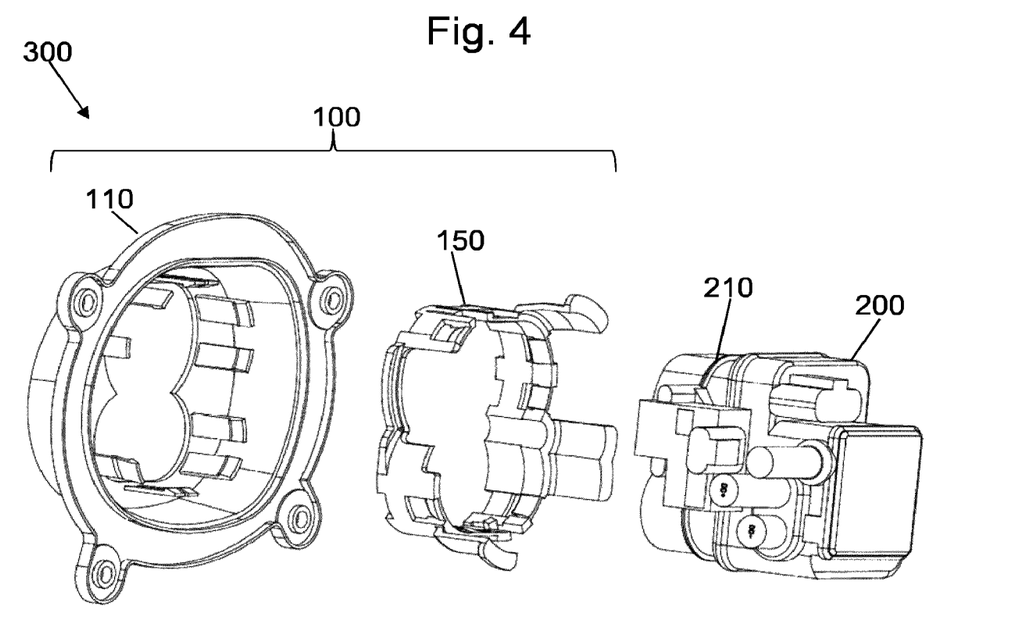
FIG. 4 is an exploded view of a holding system according to an exemplary embodiment.

FIG. 4 shows an exploded view of a holding system 300 for mounting a charging device, for example in a motor vehicle. The holding system 300 comprises a base plate 110 and a securing frame 150 which together form a holding assembly 100 as described above. The holding system 300 further comprises an electrical charging device 200 which is provided for holding by means of the holding assembly 100. For this purpose, the charging device 200 comprises a latching contour 210, and the latching hooks 114 of the base plate 110 are designed for latching with the latching contour 210. The electrical charging device 200 is, for example, a charging device for an electrically driven motor vehicle.

Figure 5A:
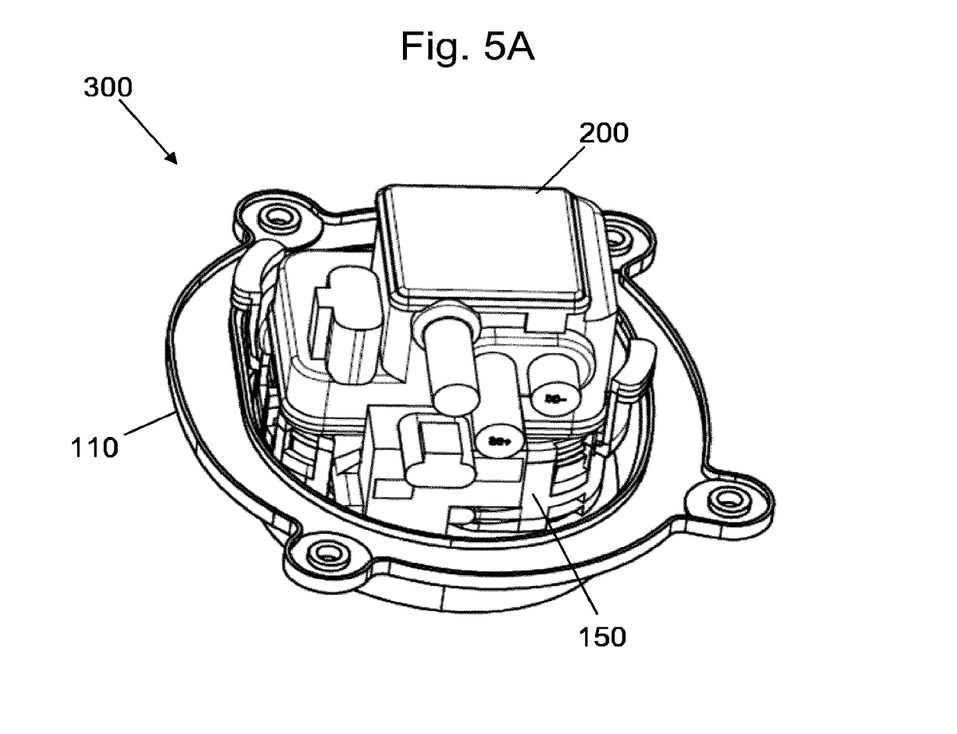
FIGS. 5A-5C are schematic representations of various views of a holding system according to an exemplary embodiment.
Figure 5B:
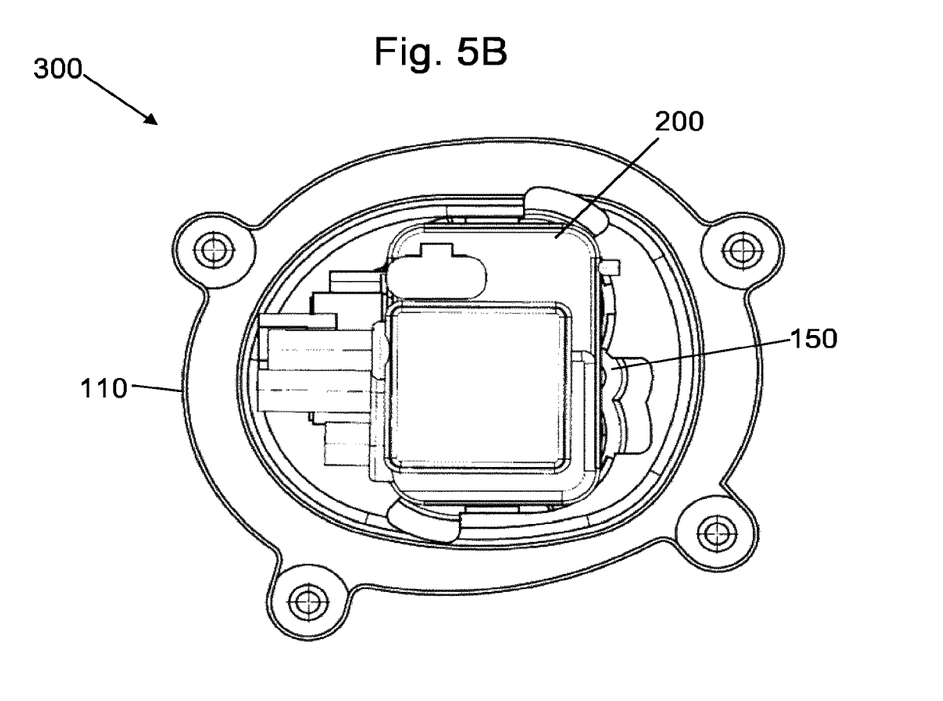
Figure 5C:
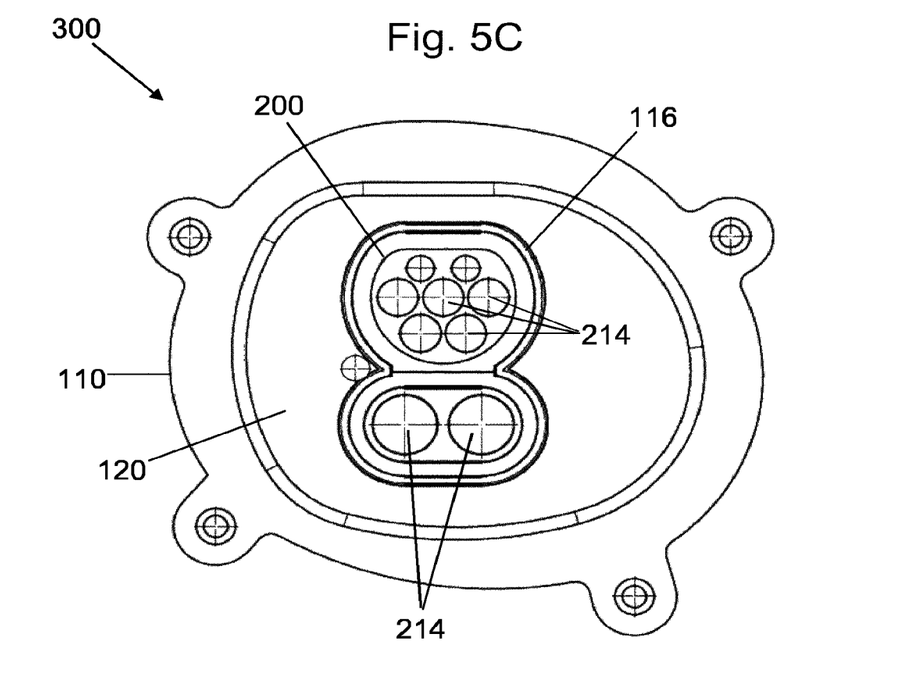

FIGS. 5A to 5C show schematic representations of various views of a holding system 300 in an assembled state.

FIG. 5A shows a perspective view of the holding system 300. The partial enclosing of the charging device 200 by the base plate 110 and by the securing frame 150 can be seen here. In the charging device 200 shown, a contact region for contacting by means of a charging current source is provided on an underside of the charging device 200 which is accessible by means of the opening 116 in the base plate 110.

FIG. 5B shows a top view of the holding system 300. The arrangement of the fastening elements 118 and of the operating elements 158 of the securing frame 150 with respect to the base plate 110 can be seen.

FIG. 5C shows a view of the underside of the holding system 300. A plurality of contact elements 214 on the underside of the charging device 200 are shown. The contact elements 214 are accessible through the opening 116 in the base plate 110, for example for contacting by means of a charging current source. In addition, an adapted arrangement of the opening 116 and of the contact elements 214 with respect to each other can be seen. In the example shown, a plug-in direction of the charging device runs parallel to the direction of extension of the latching hooks 114 of the holding assembly. In this way, a stability of the holding system 300, for example when a plug-in connection to the charging current source is formed or released, is favored.

Figure 6:
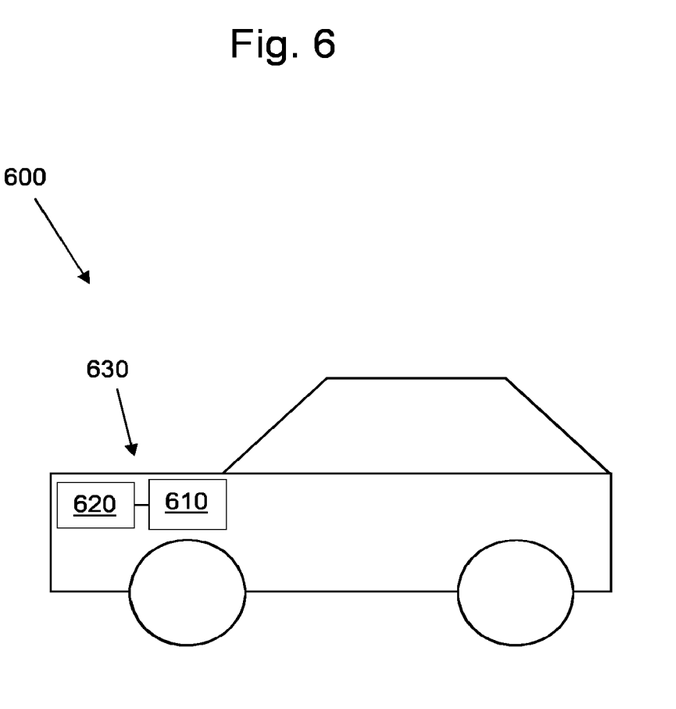
FIG. 6 is a schematic representation of a motor vehicle with a holding system according to an exemplary embodiment.

FIG. 6 shows a schematic representation of a motor vehicle 600. The motor vehicle 600 comprises a holding system 630 for holding an electrical charging device as described above. In particular, the holding system 630 comprises a holding assembly 610 and an electrical charging device 620 held in the holding assembly 610. The electrical charging device 620 is provided, for example, for charging an energy supply in the motor vehicle 600 for driving the motor vehicle 600, doing so by contacting with a charging current source.

Figure 7:
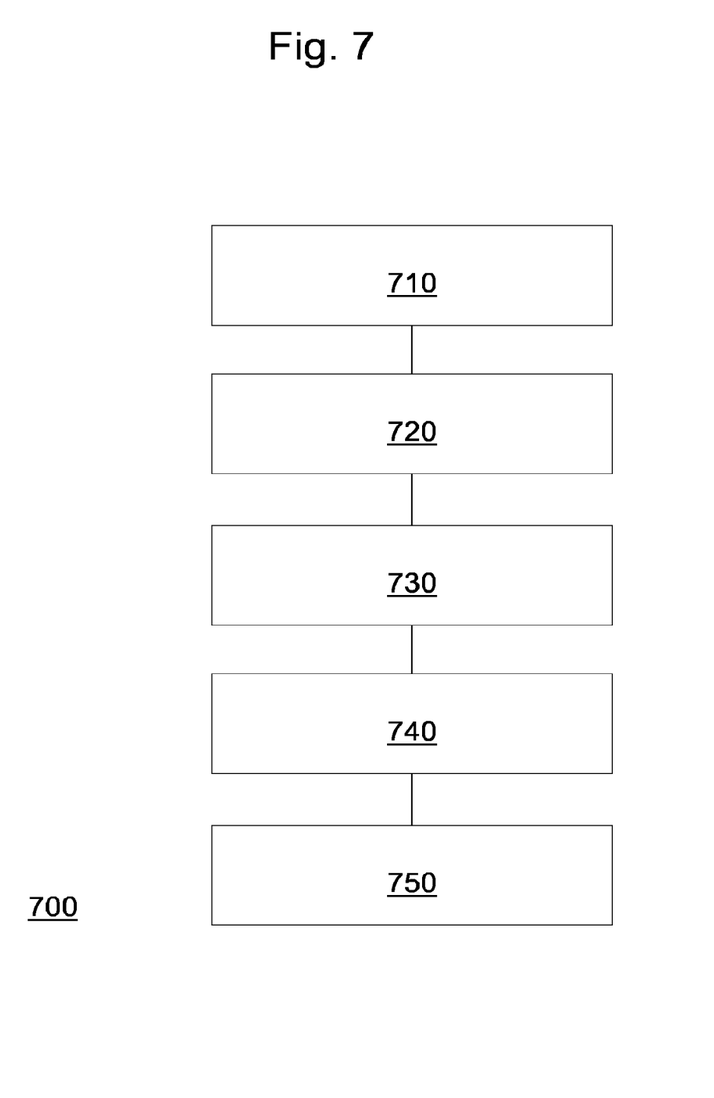
FIG. 7 is a flowchart of a method for mounting a charging device in a motor vehicle according to an exemplary embodiment.

FIG. 7 shows a flow diagram of a method 700 for mounting a charging device in a motor vehicle. The charging device is, for example, a charging device for charging an energy supply in the motor vehicle, as described above.

The method 700 comprises provision of a holding assembly, step 710. The holding assembly is, for example, a holding assembly as described in connection with the preceding figures. The method 700 further comprises provision of a charging device, step 720. The charging device has at least one latching contour, and at least one latching hook of the holding assembly is designed for latching with the latching contour of the charging device. The method 700 further comprises fastening the holding assembly to a body of the motor vehicle, step 730. After the holding assembly is fastened, the method 700 comprises arranging the charging device in the holding assembly, step 740. When the charging device is arranged in the holding assembly, the securing frame of the holding assembly is in the first position. The method 700 further comprises moving the securing frame into the second position, step 750. This takes place in such a way that a secure latching of the latching hook or hooks of the holding assembly with the latching contour of the charging device takes place.

The above-described techniques permit a simple, for example force-free, mounting of a charging device in a motor vehicle. The possibility of an easy pre-latching of a charging device inserted into the holding assembly makes it possible to further simplify mounting of the charging device. At the same time, the described techniques ensure a secure connection of the charging device to the holding assembly. The described techniques are also versatile. In particular, only possibly different base plates for the holding assembly need be provided for an optimized use of the same charging device with different vehicle types. At the same time, the described techniques can be used with different charging devices, wherein only correspondingly designed base plates and/or securing frames may need to be provided.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100, 610 Holding assembly
110 Base plate
112 Upper side
114 Latching hook
116 Opening
118 Fastening element
120 Underside
150 Securing frame
152 Clamping contour
154 Securing contour
156 Recess
158 Operating tab
160 Locking latching hook
200, 620 Charging device
210 Latching contour
212 Locking latching contour
214 Contact element
300, 630 Holding system
600 Motor vehicle
700 Method
710-750 Method steps

The invention claimed is:

1. A holding assembly for holding an electrical charging device, comprising:
   a base plate having an upper side and at least one latching hook which extends from the upper side of the base plate and which is configured to latch with a latching contour of the charging device; and a securing frame which is attached to the base plate so as to be movable between a first position and a second position and is configured to clamp the latching hook in an open state in the first position and to secure the latching hook in a closed state in the second position.

2. The holding assembly according to claim 1, wherein the base plate has a plurality of latching hooks.

3. The holding assembly according to claim 1, wherein the securing frame comprises at least one clamping contour configured to clamp the latching hook into the open state and at least one securing contour configured to secure the latching hook in the closed state.

4. The holding assembly according to claim 1, wherein the securing frame has at least one recess and is attached to the base plate such that the latching hook projects at least partially into the recess when the securing frame is in the first position.

5. The holding assembly according to claim 1, wherein a change from the first position to the second position of the securing frame corresponds to a movement of the securing frame at least substantially perpendicular to the upper side.

6. The holding assembly according to claim 5, wherein the movement corresponds to a movement in a direction proceeding away from the upper side.

7. The holding assembly according to claim 1, wherein the base plate has at least one fastening element configured to fasten the holding assembly.

8. The holding assembly according to claim 7, wherein the charging device comprises a charging device for an electrically driven motor vehicle and the fastening element is configured to fasten the holding assembly in the motor vehicle.

9. The holding assembly according to claim 1, wherein the securing frame comprises at least one locking latching hook which is configured to latch with a locking latching contour of the charging device when the securing frame is in the second position in order to lock the securing frame in the second position.

10. The holding assembly according to claim 1, wherein the securing frame comprises at least one operating tab configured to move the securing frame manually from the first position into the second position.

11. The holding assembly according to claim 1, wherein the base plate has at least one opening which is configured to permit access to the charging device from an underside of the base plate when the charging device is held by the holding assembly.

12. A holding system for holding an electrical charging device, comprising:
the holding assembly according to claim 1; and
a charging device having at least one latching contour,
wherein the at least one latching hook of the holding assembly is configured to latch with the latching contour of the charging device.

13. The holding system according to claim 12, wherein the base plate has at least one opening which is configured to permit access to the charging device from an underside of the base plate when the charging device is held by the holding assembly, and
wherein the charging device at least partially projects through the opening in the base plate when the charging device is held by the holding assembly.

14. The holding system according to claim 12, wherein the charging device comprises at least one contact element which is arranged on a side of the charging device facing the upper side of the base plate and which is configured to contact a charging current source.

15. The holding system according to claim 12, wherein the at least one latching hook extends parallel to a plug-in direction of the charging device.

16. A motor vehicle, comprising:
the holding assembly according to claim 1.

17. A method for mounting a charging device in a motor vehicle, comprising:
providing a holding assembly comprising a base plate having an upper side and at least one latching hook which extends from the upper side of the base plate and is configured to latch with a latching contour of the charging device, and a securing frame which is attached to the base plate so as to be movable between a first position and a second position and is configured to clamp the latching hook in an open state in the first position and to secure the latching hook in a closed state in the second position;
providing the charging device, which has at least one latching contour, the at least one latching hook of the holding assembly being configured to latch with the latching contour of the charging device;
fastening the holding assembly to a body of the motor vehicle;
arranging the charging device in the holding assembly, the securing frame being in the first position; and
moving the securing frame into the second position to form a secured latching of the latching hook with the latching contour.

18. A motor vehicle, comprising:
the holding system according to claim 12.

* * * * *